United States Patent [19]

Lanzer

[11] Patent Number: 4,729,262

[45] Date of Patent: Mar. 8, 1988

[54] TRANSMISSION UNIT

[75] Inventor: Heribert Lanzer, Graz, Austria

[73] Assignee: Steyr-Daimler-Puch AG, Vienna, Austria

[21] Appl. No.: 905,929

[22] Filed: Sep. 10, 1986

[30] Foreign Application Priority Data

Sep. 13, 1985 [AT] Austria ................. 2680/85

[51] Int. Cl.$^4$ ................. F16H 3/44; F16H 57/10
[52] U.S. Cl. ................. 74/782; 192/58 C; 180/248
[58] Field of Search ................. 74/711, 714, 782; 180/249, 248; 192/58 C

[56] References Cited

U.S. PATENT DOCUMENTS

| | | | |
|---|---|---|---|
| 2,219,215 | 10/1940 | Anderson | 74/782 X |
| 2,343,509 | 3/1944 | Jamdasek | 74/782 |
| 2,743,792 | 5/1956 | Ransom | 74/711 X |
| 3,760,922 | 9/1973 | Roh et al. | 74/710.5 X |
| 3,834,502 | 9/1974 | Sommer | 192/58 C X |
| 3,869,940 | 3/1975 | Webb et al. | 74/711 |
| 3,894,446 | 7/1975 | Snoy et al. | 74/710.5 X |
| 3,899,941 | 8/1975 | Cook | 74/782 X |
| 4,031,780 | 6/1977 | Dolan et al. | 192/58 C X |
| 4,058,027 | 11/1977 | Webb | 192/58 C X |
| 4,488,626 | 12/1984 | Handke | 192/58 C X |
| 4,601,359 | 7/1986 | Weismann et al. | 180/248 X |

FOREIGN PATENT DOCUMENTS

| | | |
|---|---|---|
| 378246 | 7/1985 | Austria . |
| 1802456 | 5/1969 | Fed. Rep. of Germany . |
| 2237727 | 2/1973 | Fed. Rep. of Germany . |
| 1655256 | 11/1973 | Fed. Rep. of Germany . |
| 3427566 | 2/1985 | Fed. Rep. of Germany . |
| 988599 | 8/1951 | France . |
| 2106667 | 4/1972 | France . |
| 678186 | 8/1952 | United Kingdom . |
| 1357106 | 6/1974 | United Kingdom . |

Primary Examiner—Dirk Wright
Attorney, Agent, or Firm—Marmorek, Guttman & Rubenstein

[57] ABSTRACT

A transmission unit particularly intended for use as a differential between driven axles of a vehicle comprises an epicyclic gear train having three rotatable members, specifically, an input member connected to an input shaft, a second member connected to one section of a liquid friction coupling, and an output member connected to an output shaft. To avoid an occurrence of constraining torques as the vehicle is steered and to permit a modulation within a wide range of the relationship between the speed difference between the sections of the coupling and the torque limit of the transmission unit, the second section of the liquid friction coupling is non-rotatably connected to a stationary structure of the transmission unit, specifically to a housing of the epicyclic gear train. Alternatively, said second section of the coupling may be adapted to be held against rotation by a brake, so that the axles of the vehicles can easily be uncoupled from each other. Output torque is delivered from the transmission unit only by the output member of the epicyclic gear train.

18 Claims, 3 Drawing Figures

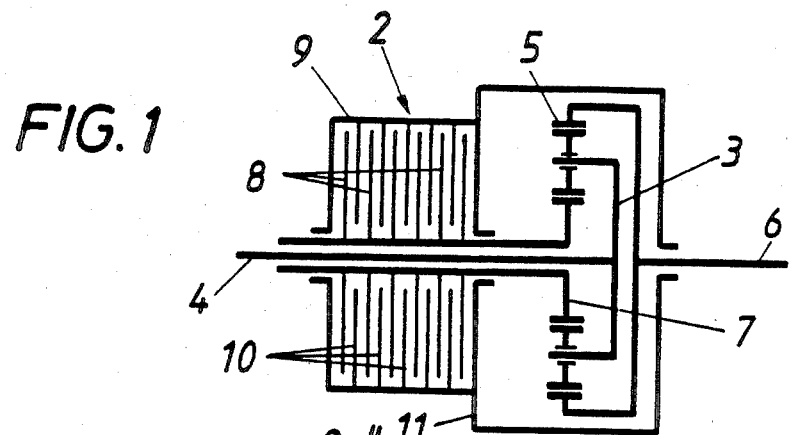
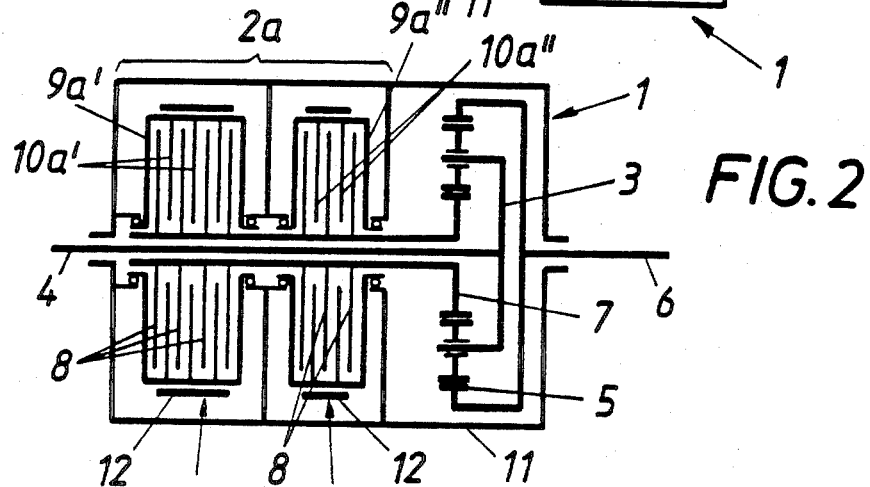
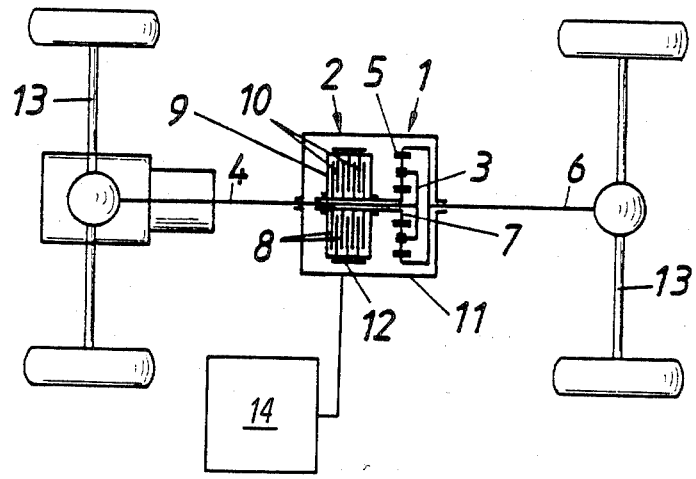

TRANSMISSION UNIT

BACKGROUND OF THE INVENTION

1. Field of the Invention

This invention relates to a transmission unit, particularly to a transmission unit which acts in the manner of a differential between driven axles of a motor vehicle. The transmission unit comprises an epicyclic gear train having a rotatable input member, a second rotatable member, and a rotatable output member, and the transmission also comprises a liquid friction coupling which is connected to said second rotatable member.

2. Description of the Prior Art

British Patent Specification No. 1,357,106 discloses a transmission unit which is of that type and in which the epicyclic gear train consists of a planetary gear train having a planet carrier which is driven by the engine whereas the sun gear and the internal gear are connected to respective axles of the vehicle and to respective sections of the liquid friction coupling. In that transmission unit the epicyclic gear train constitutes a differential between driven axles of a vehicle and the liquid friction coupling serves to lock the differential. The same printed publication discloses also the use of a liquid friction coupling as an interaxle differential. Both embodiments have various disadvantages, which will now be explained.

When the vehicle is cornering so that the wheels of the two axles rotate at different speeds, the resulting speed difference between the sections of the liquid friction coupling gives rise to a cunstraining torque, which opposes the steering of the vehicle. The steering will become particularly difficult at low temperatures because the constraining torque will then be increased by the high viscosity of the liquid in the liquid friction coupling. Besides, in the two known embodiments the two axles cannot be uncoupled from each other although such uncoupling will be necessary, e.g., when the vehicle is being hauled in a condition in which one axle is raised and its wheels are blocked, or when the vehicle is to be tested on a test stand that is designed to take up only one axle. An uncoupling of the two driven axles from each other must also be possible, as a rule, in a vehicle having a brake system provided with an anti-block device. Because both sections of the liquid friction coupling are rotated, a considerable structural expenditure will be involved in an arrangement in which the coupling can be externally controlled to modulate the relationship between the speed difference between the sections of the coupling and the torque limit of the transmission unit.

SUMMARY OF THE INVENTION

For this reason it is an object of the invention to eliminate said disadvantages and to provide a transmission unit which is of the kind described first hereinbefore and which even during the cold season will not give rise to constraining torques which would oppose the steering of the vehicle.

It is another object of the invention to provide such a transmission unit which acts in the manner of an interaxle differential between two driven axles of a motor vehicle and permits said axles easily to be uncoupled from each other.

It is a further object of the invention to provide such a transmission unit in which the relationship between the speed difference between the two sections of the coupling and the torque limit of the transmission unit can be modulated throughout a wide range.

Further advantages of the invention will become apparent as the description proceeds.

In a transmission unit of the kind described first hereinbefore the objects set forth hereinbefore and other objects are accomplished in that the second section of the liquid friction unit is non-rotatably connected to a stationary structure of the transmission unit or said second section is adapted to be held against rotation by a brake, and said output member is the only torque output member of said transmission unit.

That transmission unit is unique in that the second section of the liquid friction coupling does not rotate during the normal operation of the vehicle. As a rule, said section is constituted by the liquid-filled housing of that coupling. Such an arrangement will permit the liquid friction coupling easily to be controlled from the outside by simple means in order to change the characteristic of said coupling in dependence on the desired performance. If the second section of the liquid friction coupling is adapted to be held against rotation by a brake rather than non-rotatably connected to a stationary structure of the transmission unit, a simple mechanism can be provided for releasing said second section of the coupling so that it is freely rotatable. Owing to the special arrangement of the transmission unit, the release of the second section of the liquid friction coupling will have the result that the liquid friction coupling is inoperative so that the two axles are uncoupled from each other. As a result, a rotation of the axles at different speeds will not give rise to constraining torques and the vehicle can be hauled without difficulty without a need for a control of the conditions in the interior of the liquid friction coupling.

Within the scope of the invention the liquid friction coupling is adapted to be controlled in a manner known per se in order to modulate the relationship between the speed difference between the sections of the coupling and the torque limit of the transmission unit. Such a control can be effected, e.g., by a change of the quantity of liquid in the coupling, by a change of the clearance between the active surfaces of the interdigitating elements of the two sections of the coupling, by a change of the internal pressure in the coupling, and/or by a change of other parameters. In that case it will be possible to obtain any desired performance of the liquid friction coupling even if its second section is permanently held against rotation. The conditions in the interior of the coupling can be controlled without difficulty because the second section of the coupling is held against rotation.

The characteristic of the entire transmission unit can also be changed if at least two liquid friction couplings are provided, which are connected in parallel, and the second sections of said couplings are adapted to be held against rotation by respective brakes independently of each other. For instance, if two liquid friction couplings having highly different characteristics are connected in parallel to each other, the performance of the entire transmission unit can be changed within a wide range in that the second sections of the two liquid friction couplings are braked to a stop a the same time or in alternation. The change of said performance can be effected within very short time. For instance, only one liquid friction coupling may be operative during normal operation. If the other liquid friction coupling is then rendered operative in that it is braked to a stop, the transmission unit will operate with a hard characteristic, which is desirable during a travel under a high load or during a braking without a use of the antiblock device. When the second sections of both liquid friction couplings are released by the associated brakes, the transmission of torque between the axles of the vehicle will be entirely interrupted and the vehicle can then be hauled or the operation of a brake system provided with an antiblock device will not be disturbed. The range in which the characteristic of the entire transmission unit can be modulated will obviously be increased further if each of the liquid friction couplings is adapted to be automatically or arbitrarily controlled.

The transmission unit in accordance with the invention cannot be used only as a differential between driven axles of a motor vehicle but can be used for general purpose as a transmission unit having a load-dependent transmission ratio or two of such transmission units may be symmetrically arranged to provide an interwheel differential between the wheels of one and the same axle.

BRIEF DESCRIPTION OF THE DRAWING

FIG. 1 is a diagrammatic view showing the general structure of a transmission unit embodying the invention.

FIG. 2 is a diagrammatic view showing a modification.

FIG. 3 is a diagrammatic view showing a transmission unit installed as a differential between driven axles of a motor vehicle.

DETAILED DESCRIPTION OF THE PREFERRED EMBODIMENTS

The transmission unit in accordance with the invention comprises an epicyclic gear train having three rotatable members, specifically a planetary gear train 1, and a liquid friction coupling 2. One of the rotatable members of the planetary gear train 1, specifically the planet carrier 3, constitutes an input member, which is directly connected to an input shaft 4. The internal gear 5 constitutes an output member, which is the only torque output member of the transmission unit and connected to an output shaft 6. The sun gear 7 is non-rotatably connected to one coupling section of the liquid friction coupling 2, specifically to that section which comprises inner blades 8.

In the embodiment shown in FIG. 1 the second section of the coupling 2, specifically the housing 9 provided with the outer blades 10 is nonrotatably secured to a stationary structure of the transmission unit, specifically to the stationary housing 11, which accommodates the planetary gear train 1. The characteristic of the liquid friction coupling 2 can be changed by an external control 14 in that the clearance between adjacent blades 8, 10 or the quantity of liquid in the coupling 2 or the internal pressure in the coupling 2 or other operational parameters of the coupling are changed from the outside.

In the embodiment shown in FIG. 2, the liquid friction coupling means 2a comprise two liquid friction couplings 2a', 2a", which are connected in parallel in that the inner blades 8 of both couplings are non-rotatably connected to the sun gear 7. The second sections of the two liquid friction couplings 2a', 2a", specifically the housings 9a' and 9a" provided with the outer blades 10a' and 10a", respectively, are adapted to be held against rotation independently of each other by respective brake bands 12. It is apparent that the two liquid friction couplings 2a' and 2a" differ as regards the number of inner blades 8 and outer blades 10a' and 10a" so that they have inherently different characteristics.

FIG. 3 shows how the transmission unit can be installed as a differential between driven axles 13 of a motor vehicle. Input shaft 4 is directly connected at one end to driven axle 13 appearing at the left hand side of FIG. 3, and at its other end to planet carrier 3. Just as the two liquid friction couplings 2a' and 2a" shown in FIG. 2, the liquid friction coupling 2 is not secured to the housing 11 but is adapted to be held against rotation by means of a brake band 12.

I claim:

1. A transmission unit for a motor vehicle, comprising a drive shaft having two ends,
first and second driven axles,
a gear unit installed between said first and second driven axles, said gear unit driving said first driven axle and controlling the relative rotational speeds of said first and second driven axles, said gear unit comprising
an epicyclic gear train having a first rotatable input member connected to and being driven by one end of said drive shaft, a second rotatable member, and a third rotatable output member connected to and driving said first driven axle,
a liquid friction clutch unit having first and second sections coupled to each other by viscous shear forces, said second rotatable member of said gear train connected to said first coupling section, and
restraining means connected to said second coupling section for holding said second coupling section and thereby said second rotatable member against rotation,
said second driven axle being connected to and being driven by said other end of said drive shaft.

2. The transmission unit set forth in claim 1 wherein said liquid friction clutch unit is actuable to control the relative rotational speeds of said first and second driven axles.

3. The transmission unit set forth in claim 1, wherein said restraining means comprise a stationary structure which is non-rotatably connected to said second coupling section.

4. The transmission unit set forth in claim 3, wherein said stationary structure comprises a housing, which accommodates said epicyclic gear train and is non-rotatably connected to said second coupling section.

5. The transmission unit set forth in claim 1, wherein said restraining means comprise a brake for holding said second coupling section against rotation.

6. A transmission unit as set forth in claim 5 wherein a second liquid friction clutch unit is provided, which has a first coupling section, which is connected to said second part of said epicyclic gear train, and a second coupling section, and
first and second brakes are provided, which are mutually independently operable to hold said second coupling sections of both said liquid friction clutch units against rotation.

7. The transmission unit set forth in claim 6, wherein said liquid friction clutch units differ in their inherent characteristics.

8. The transmission unit set forth in claim 6, wherein said liquid friction clutch units define for said transmission unit a torque limit depending on the speed difference between the first and second coupling sections of each of said liquid friction clutch units and control means are provided for controlling said liquid friction couplings so as to modulate the relationship between said speed differences and said torque limit.

9. The transmission unit set forth in claim 8, wherein said control means are arbitrarily operable.

10. The transmission unit set forth in claim 8, wherein said control means are automatically operable.

11. The transmission unit set forth in claim 1, wherein said liquid friction clutch unit determines for said transmission unit a torque limit depending on the speed difference between said first and second coupling sections and control means are provided for controlling said liquid friction clutch unit so as to modulate the relationship between said speed difference and said torque limit.

12. The transmission unit set forth in claim 11, wherein control means are provided for changing the quantity of liquid contained in said liquid friction clutch unit.

13. The transmission unit set forth in claim 11, wherein said first and second coupling sections have interdigitating elements, which define clearances between them, and control means are provided for changing the clearances between said interdigitating elements.

14. The transmission unit set forth in claim 11, wherein control means are provided for changing the pressure in said liquid friction clutch unit.

15. The transmission unit set forth in claim 11, wherein said control means are arbitrarily operable.

16. The transmission unit set forth in claim 11, wherein said control means are automatically operable.

17. The transmission set forth in claim 1, wherein said epicyclic gear train comprising a planetary gear train having a rotatable input member comprising a planet carrier, a rotatable second member comprising a sun gear, and a rotatable output member comprising an internal gear.

18. The transmission unit of claim 6 wherein said first and second liquid friction clutch units are connected in parallel.

* * * * *